US012356469B2

(12) United States Patent
Orpaz et al.

(10) Patent No.: US 12,356,469 B2
(45) Date of Patent: Jul. 8, 2025

(54) WIRELESS BROADCAST AND DETECTION OF DATA AVAILABILITY

(71) Applicant: BabyArk LTD, Hevel Modiln Industrial Park (IL)

(72) Inventors: Nir Orpaz, Kfar Saba (IL); Shy Mindel, Hod-HaSharon (IL)

(73) Assignee: BabyArk LTD, Hevel Modiin Industrial Park (IL)

( * ) Notice: Subject to any disclaimer, the term of this patent is extended or adjusted under 35 U.S.C. 154(b) by 423 days.

(21) Appl. No.: 17/985,973

(22) Filed: Nov. 14, 2022

(65) Prior Publication Data

US 2023/0156827 A1    May 18, 2023

(30) Foreign Application Priority Data

Nov. 14, 2021  (IL) .......................................... 288088

(51) Int. Cl.
  *H04W 76/10*  (2018.01)
  *H04W 12/106* (2021.01)
  *H04W 76/50*  (2018.01)

(52) U.S. Cl.
  CPC ......... *H04W 76/10* (2018.02); *H04W 12/106* (2021.01); *H04W 76/50* (2018.02)

(58) Field of Classification Search
  CPC ............... H04W 76/10; H04W 12/106; H04W 76/50; H04W 4/38; H04W 92/18; H04W 84/18;

(Continued)

(56) References Cited

U.S. PATENT DOCUMENTS

| 10,932,108 | B1 * | 2/2021 | Balmakhtar | .......... H04W 12/06 |
| 2006/0208169 | A1 * | 9/2006 | Breed | ..................... G01S 15/88 250/221 |

(Continued)

FOREIGN PATENT DOCUMENTS

| CN | 113225407 | 8/2021 |
| WO | WO 2014/135711 | 9/2014 |
| WO | WO 2019/236380 | 12/2019 |

OTHER PUBLICATIONS

European Search Report and the European Search Opinion Dated Mar. 21, 2023 From the European Patent Office Re. Application No. 22207158.1. (13 Pages).

(Continued)

*Primary Examiner* — Benjamin H Elliott, IV (57) ABSTRACT

A method that comprises using at least one processor of a mobile device for receiving a device identifier of wireless device(s) broadcasted by the wireless device(s) via wireless channel(s) and intercepted by the mobile device, the device identifier comprising a fixed part uniquely identifying the wireless device(s) and an adjustable part indicative of associated data available at the wireless device(s), comparing between the adjustable part of the intercepted device identifier and the adjustable part of a previously intercepted device identifier of the wireless device(s) identified by the fixed part, establishing a connection with the at least one wireless device via the at least one wireless channel in case the adjustable part of the intercepted device identifier is different from the adjustable part of the previously intercepted device identifier, and communicating with the at least one wireless device to receive updated data associated with the adjustable part of the intercepted device identifier.

20 Claims, 4 Drawing Sheets

(58) Field of Classification Search
CPC ..... H04W 24/02; H04W 76/11; H04W 48/10; H04L 61/301; H04L 41/0816; H04L 43/0805
See application file for complete search history.

(56) References Cited

U.S. PATENT DOCUMENTS

| | | | | |
|---|---|---|---|---|
| 2007/0178888 | A1* | 8/2007 | Alfano | H04W 48/18 455/414.1 |
| 2009/0024004 | A1* | 1/2009 | Yang | G16Z 99/00 600/301 |
| 2009/0055691 | A1* | 2/2009 | Ouksel | H04W 64/00 714/48 |
| 2009/0078753 | A1* | 3/2009 | Sato | H04L 61/30 235/375 |
| 2012/0188083 | A1* | 7/2012 | Miller, II | A61B 5/11 2/410 |
| 2014/0253313 | A1* | 9/2014 | Schoenberg | B60N 2/0029 340/457 |
| 2015/0318015 | A1* | 11/2015 | Bose | G08B 21/043 386/248 |
| 2016/0029148 | A1* | 1/2016 | Jackson | H04W 4/70 455/41.2 |
| 2016/0035205 | A1* | 2/2016 | Messenger | G16H 40/67 340/539.15 |
| 2017/0024555 | A1* | 1/2017 | Flitsch | H04L 67/12 |
| 2017/0238129 | A1* | 8/2017 | Maier | H04W 4/14 455/404.2 |
| 2017/0258398 | A1* | 9/2017 | Jackson | A61B 5/0507 |
| 2018/0074156 | A1* | 3/2018 | Arunachalam | H04W 4/18 |
| 2018/0183874 | A1* | 6/2018 | Cook | H04L 41/145 |
| 2018/0232638 | A1* | 8/2018 | Lin | G06N 3/063 |
| 2019/0104954 | A1* | 4/2019 | Campbell | A61B 5/0816 |
| 2019/0209022 | A1* | 7/2019 | Sobol | A61B 5/1112 |
| 2019/0261370 | A1* | 8/2019 | Amini | G06F 9/542 |
| 2019/0373058 | A1* | 12/2019 | De Almeida Forjaz de Lacerda | H04W 56/0015 |
| 2021/0212576 | A1* | 7/2021 | MacNeish | A61B 5/0816 |
| 2021/0319894 | A1* | 10/2021 | Sobol | G16H 20/30 |
| 2021/0361165 | A1* | 11/2021 | Rogers | A61B 5/683 |
| 2023/0156827 | A1* | 5/2023 | Orpaz | H04W 76/50 370/329 |
| 2024/0285175 | A1* | 8/2024 | Wunderlich | A61B 5/14532 |

OTHER PUBLICATIONS

Office Action and Search Report Dated May 10, 2022 From the Israel Patent Office Re. Application No. 288088. (8 Pages).

Office Action Dated Nov. 3, 2022 From the Israel Patent Office Re. Application No. 288088. (5 Pages).

* cited by examiner

WIRELESS BROADCAST AND DETECTION OF DATA AVAILABILITY

RELATED APPLICATION(S)

This application claims the benefit of priority of Israel Patent Application No. 288088 filed on Nov. 14, 2021, the contents of which are incorporated by reference as if fully set forth herein in their entirety.

BACKGROUND

The present invention, in some embodiments thereof, relates to broadcasting and detecting availability of updated data at wireless devices, and, more specifically, but not exclusively, to broadcasting and detecting availability of updated data at wireless devices according to data broadcasted before establishing a connection between the wireless devices.

Wireless communication has long past become a basic and essential building block technology for a wide range of products, applications, systems, services, and platforms in almost any aspect of modern life including communications, gaming, and leisure, automotive, automation, safety, security applications, public order, military and defense applications to name just a few.

As such, a plurality of communication protocols have been developed and applied to support efficient wireless communication under diverse and demanding operational conditions characterized by different operational parameters and attributes such as, for example, speed, bandwidth, data integrity, power consumption, spectral range and many more.

SUMMARY

It is an object of the present invention to provide, methods, systems and software program products for detecting availability of updated data at a wireless device without communicating with the wireless device based on device information broadcasted by the wireless device which is indicative of the updated data. The foregoing and other objects are achieved by the features of the independent claims. Further implementation forms are apparent from the dependent claims, the description and the figures.

According to a first aspect of the present invention there is provided a method of connecting temporarily to wireless devices indicating availability of updated data, comprising using one or more processors of a mobile device for:

Receiving a device identifier of one or more wireless devices broadcasted by each of the one or more wireless devices via one or more wireless channels and intercepted by the mobile device. The device identifier comprising a fixed part uniquely identifying the respective wireless device and an adjustable part indicative of associated data available at the respective wireless device.
  Comparing between the adjustable part of the intercepted device identifier of a respective wireless device and the adjustable part of a previously intercepted device identifier of the respective wireless devices identified by the fixed part of its device identifier.
  Establishing a connection with the respective wireless devices via the one or more wireless channels in case the adjustable part of the intercepted device identifier is different from the adjustable part of the previously intercepted device identifier.
  Communicating with the respective wireless devices to receive updated data associated with the intercepted device identifier.
  Terminating the connection with the respective wireless device.

According to a second aspect of the present invention there is provided a mobile device for connecting temporarily to wireless devices indicating availability of updated data, comprising one or more wireless transceivers, and one or more processors coupled to the one or more wireless transceivers. The one or more processors are adapted to execute code. The code comprising:

Code instructions to receive a device identifier of one or more wireless devices broadcasted by each of the one or more wireless devices via one or more wireless channels and intercepted by the mobile device. The device identifier comprising a fixed part uniquely identifying the respective wireless device and an adjustable part indicative of associated data available at the respective wireless device.
  Code instructions to compare between the adjustable part of the intercepted device identifier of a respective wireless device and the adjustable part of a previously intercepted device identifier of the respective wireless devices identified by the fixed part of its device identifier.
  Code instructions to establish a connection with the respective wireless devices via the one or more wireless channels in case the adjustable part of the intercepted device identifier is different from the adjustable part of the previously intercepted device identifier.
  Code instructions to communicate with the respective wireless devices to receive updated data associated with the intercepted device identifier.
  Code instructions to terminate the connection with the respective wireless device.

According to a third aspect of the present invention there is provided a method of indicating availability of updated data by a wireless channel, comprising using one or more processors of a wireless device for:

Collecting updated data.
  Adjusting a device identifier of the wireless device. The device identifier comprising a fixed part uniquely identifying the wireless device and an adjustable part indicative of the updated data.
  Broadcasting the adjusted device identifier via one or more wireless channels.
  Wherein, in response to interception of the adjusted device identifier, one or more mobile devices establish a connection with the wireless device via the one or more wireless channels to receive the updated data and terminate the connection after receiving the updated data.

According to a fourth aspect of the present invention there is provided a wireless device, comprising one or more wireless transceivers configured to connect to one or more wireless channels and one or more processors coupled to the one or more wireless transceivers. The one or more processors are adapted to execute code. The code comprising:

Code instructions to collect updated data.
  Code instructions to adjust a device identifier of the wireless device. The device identifier comprising a fixed part uniquely identifying the wireless device and an adjustable part indicative of the updated data.
  Code instructions to broadcast the adjusted device identifier of the wireless device via one or more wireless channel.

Wherein, in response to interception of the adjusted device identifier, one or more mobile devices establish a connection with the wireless device via the one or more wireless channels to receive the updated data and terminate the connection after receiving the updated data.

In a further implementation form of the first, second, third and/or fourth aspects, the one or more wireless devices are deployed for collecting information relating to one or more children located in one or more child hosting apparatuses to support one or more child safety applications.

In a further implementation form of the first, second, third and/or fourth aspects, the data comprises sensory data captured by one or more sensors communicatively coupled to the one or more wireless devices.

In an optional implementation form of the first, second, third and/or fourth aspects, the adjustable part is indicative of at least part of a content of the data available at the one or more wireless devices.

In an optional implementation form of the first, second, third and/or fourth aspects, the adjustable part further comprises a signature of the available data.

In an optional implementation form of the first, second, third and/or fourth aspects, the mobile device is further configured to verify integrity of the at least part of the content of the updated data according to the signature.

In an optional implementation form of the first, second, third and/or fourth aspects, the updated data further comprises a log record comprising a plurality of data items accumulated by the one or more wireless devices.

In an optional implementation form of the first, second, third and/or fourth aspects, one or more events are generated based on content of the updated data and one or more indications are initiated to alert a user of the mobile device of the one or more events.

In a further implementation form of the first, second, third and/or fourth aspects, the one or more events comprise one or more child safety related events.

In a further implementation form of the first, second, third and/or fourth aspects, the mobile device is configured to probe the one or more wireless channels every predefined time period.

In an optional implementation form of the first, second, third and/or fourth aspects, one or more events are generated in response to detecting that the mobile device is in a transmission range of the one or more of wireless devices.

In an optional implementation form of the first, second, third and/or fourth aspects, one or more events are generated in response to detecting that the mobile device is out of a transmission range of the one or more wireless devices.

In a further implementation form of the first, second, third and/or fourth aspects, probing the one or more wireless channels is instructed by one or more constantly active services executed by the mobile device.

In a further implementation form of the first, second, third and/or fourth aspects, probing the one or more wireless channels is instructed by one or more inactive services invoked by an Operating System (OS) executed by the mobile device in response to detecting a beacon signal transmitted by the one or more wireless devices.

In an optional implementation form of the first, second, third and/or fourth aspects, one or more other mobile devices establish a connection with the one or more wireless devices to receive the updated data after the connection termination. The one or more other mobile devices establish the connection with the one or more wireless devices in response to detecting that the adjustable part of the device identifier of the one or more wireless devices is adjusted compared to the adjustable part of the device identifier of the one or more wireless devices previously intercepted by the one or more other mobile devices.

In a further implementation form of the first, second, third and/or fourth aspects, the one or more wireless channel is a member of a group consisting of: Bluetooth, Bluetooth Low energy (BLE), ZigBee, Z-WAVE, and/or Wireless Local Area Network (WLAN).

In a further implementation form of the first, second, third and/or fourth aspects, the fixed part and the adjustable part of the device identifier are defined by at one communication protocol applicable for the at least one wireless channel, the fixed part comprises one or more members of a group consisting of: Media Access Controller (MAC) address, and/or Internet Protocol (IP) address.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to broadcasting and detecting availability of updated data at wireless devices, and, more specifically, but not exclusively, to broadcasting and detecting availability of updated data at wireless devices according to data broadcasted before establishing a connection between the wireless devices.

According to some embodiments of the present invention, there are provided methods, devices and computer program products for indicating availability of data at wireless devices and transferring the data to mobile devices via one or more wireless channels, in particular, limited (short) range wireless channels, for example, Bluetooth, Bluetooth Low Energy (BLE), ZigBee, Z-Wave, Wireless Local Area Network (WLAN, e.g. Wi-Fi) and/or the like.

One or more wireless devices may be configured to collect data, for example, sensory data captured by one or more sensors, for example, pressure data, proximity data, imagery data, audible data and/or the like. One or more mobile devices, for example, a Smartphone, a smart watch, a wearable device, a carry-able device and/or the like typically associated with users may communicate with one or more of the wireless devices to receive the data collected by the wireless device(s).

Each wireless device capable of connecting and communicating via the wireless channel(s) may typically identify itself by broadcasting a device identifier as defined by one or more communication protocols applicable for the wireless channel(s). The device identifier may typically include a fixed part to uniquely and deterministically identify the wireless device, for example, a Media Access Controller (MAC) address, an Internet Protocol (IP) address and/or the like. However, the device identifier may further include an adjustable part which may be dynamically adjusted and/or changed, for example, a device name, a device status and/or the like.

One or more of the wireless devices may be therefore configured to publish availability of collected data available at the respective wireless device by adjusting the adjustable part of their device identifier. Specifically, the wireless device may compute the adjustable part of its device identifier and associate the adjusted part with respective data (dataset) such that the adjustable part is indicative of its associated data.

The adjustable part broadcasted by the wireless device as part of its device identifier may be therefore indicative of the data available at the wireless device.

One or more of the mobile devices probing the wireless channel(s), in particular mobile devices which are in relatively close proximity to the wireless device, for example, 10, 20, 50 meters and/or the like and are thus in a transmission range of the wireless device via the wireless channel(s), may intercept the device identifier broadcasted by the wireless device.

The mobile device may compare between the adjustable part of the intercepted device identifier and the adjustable part of the device identifier of the wireless device which was previously intercepted. The mobile device may use the fixed part of the device identifier to determine that the currently intercepted device identifier and the previously intercepted device identifier are correlated with the same wireless device.

In case the adjustable part of the intercepted device identifier is the same (equal) as the adjustable part of the previously intercepted device identifier, specifically a most recently intercepted device identifier and assuming that the mobile device already communicated previously with the wireless device to receive (obtain) the data associated with the adjustable part of the previously intercepted device identifier, the mobile device may determine that no updated (new) data is available at the wireless device. The mobile device may therefore avoid establishing a connection and communicating with the wireless device.

However, in case the adjustable part of the intercepted device identifier is different from the adjustable part of the previously intercepted device identifier, specifically the most recently intercepted device identifier, the mobile device may determine that new and/or updated data is available at the wireless device. In such case the mobile device may establish a connection with the wireless device and communicate with the wireless device to receive the updated data.

After receiving the updated data, the mobile device may terminate the connection with the wireless device. Optionally one or more other mobile devices may connect and communicate with the wireless device to receive the updated data after the connection with the first mobile device is terminated.

Optionally, the adjustable part of the device identifier computed by one or more of the wireless devices may be indicative of at least part of a content of the data (dataset) associated with the device name that is available at the respective wireless device. Moreover, the adjustable part computed by one or more of the wireless devices may comprise a signature, for example, a checksum, a hash value and/or the like computed based on the content of the associated data available at the respective wireless device. Using the signatures extracted from the adjustable part of the device identifier, one or more of the mobile devices may very integrity of the associated data received from one or more of the wires devices.

According to some embodiments, one or more wireless devices may be deployed in one or more child hosting apparatuses configured to host one or more children in order to support one or more child safety applications, for example, child detection, child awareness, child vital signs monitoring and/or the like. In such embodiments, the wireless devices may be configured accordingly to collect data relating to one or more children located in the child hosting apparatuses, for example, a car child seat, a car seat, a stroller, a crib, a child walker, a trampoline and/or the like.

In such embodiments, one or more wireless devices may be deployed in a child hosting apparatus and configured to detect and monitor presence and/or safety of a child in the child hosting apparatus based on data captured by one or more sensors deployed in the child hosting apparatus. For example, the wireless device(s) may collect data collected by one or more contact and/or proximity sensors (e.g. proximity sensor, magnetic field sensor, microswitch, pressure sensor, discrete Hall Effect sensor, reed switch, etc.) deployed in a car child seat to determine whether one or more Isofix connectors are latched onto corresponding fittings on the car child seat which may be indicative of a child sitting in the car child seat. In another example, the wireless device(s) may collect data captured by one or more of contact and/or proximity sensors deployed to determine whether one or more seat belts of the vehicle have been passed through one or more seat belt guides of the car child seat and optionally if they are buckled. In another example, the wireless device(s) may collect pressure data collected by one or more pressure sensors deployed in the car child seat which may be analyzed to identify a child sitting in the car child seat. In another example, the wireless device(s) may monitor one or more vital life signs, for example, breathing, body temperature, heartbeat and/or the like of a child seating in the car child seat based on life signs data captured by one or more sensors deployed in the vehicle and/or in the car child seat. In another example, the wireless device(s) may determine whether the vehicle in which a child is seating in a car child seat is moving or not based on motion data captured by one or more motion sensors deployed in the vehicle and/or in the car child seat, for example, a gyroscope, an accelerometer and/or the like.

In such embodiments, one or more mobile devices typically associated with one or more users caring and/or attending to the child(s), for example, a parent, a nanny, a baby-sitter, a nurse, a guardian and/or the like may communicate with the wireless device(s) to collect the child safety related data collected by the wireless device(s).

Publishing availability of data at the wireless devices by broadcasting an adjustable device identifier associated and indicative of the available data may present significant benefits and advantages compared to existing methods and systems for collecting data collected by wireless devices.

First, the mobile device may identify availability of updated data at the wireless device based on its broadcasted device identifier without actually establishing a connection with the wireless device and without communicating with the wireless device. The mobile device may thus communicate with the wireless device only when updated data is available at the wireless device thus significantly reducing communication with the wireless device compared to the existing methods and systems in which the mobile device establishes a connection and communicates with the wireless device to check for availability of new data regardless of whether new data is available at the wireless device or not. Since wireless communication with the mobile device may be a major power consuming activity of the wireless device, reducing the communication between the wireless device and the mobile device may significantly reduce the power consumed by the two devices. This is of particular benefit to the wireless device which is typically battery powered and hence having limited power resources. The battery life of the wireless device may be thus significantly extended which may enable use of smaller and/or lower cost batteries, reducing battery change maintenance and/or the like.

Moreover, in addition to reducing the communication exchanged between the mobile device and the wireless device, terminating their wireless connection immediately after the mobile device receives the updated data may allow other mobile devices to connect to the wireless device in order to obtain the updated data available at the wireless device. This is in contrast to some of the existing methods in which the mobile device may maintain a continuous connection with the wireless device thus preventing other mobile devices to communicate with the wireless device and obtain the updated data, thus limiting the application to a single mobile device, specifically when using wireless channels which do not support multiple connections with the wireless device, for example, Bluetooth, BLE, ZigBee and/or the like.

Furthermore, adjusting the device identifier, specifically the adjustable part of the device identifier to include a signature computed based on the content of the data available at the wireless device may enable the mobile device(s) to efficiently verify integrity of the content of the data received from the wireless device thus significantly increasing robustness, reliability and/or accuracy of the received data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
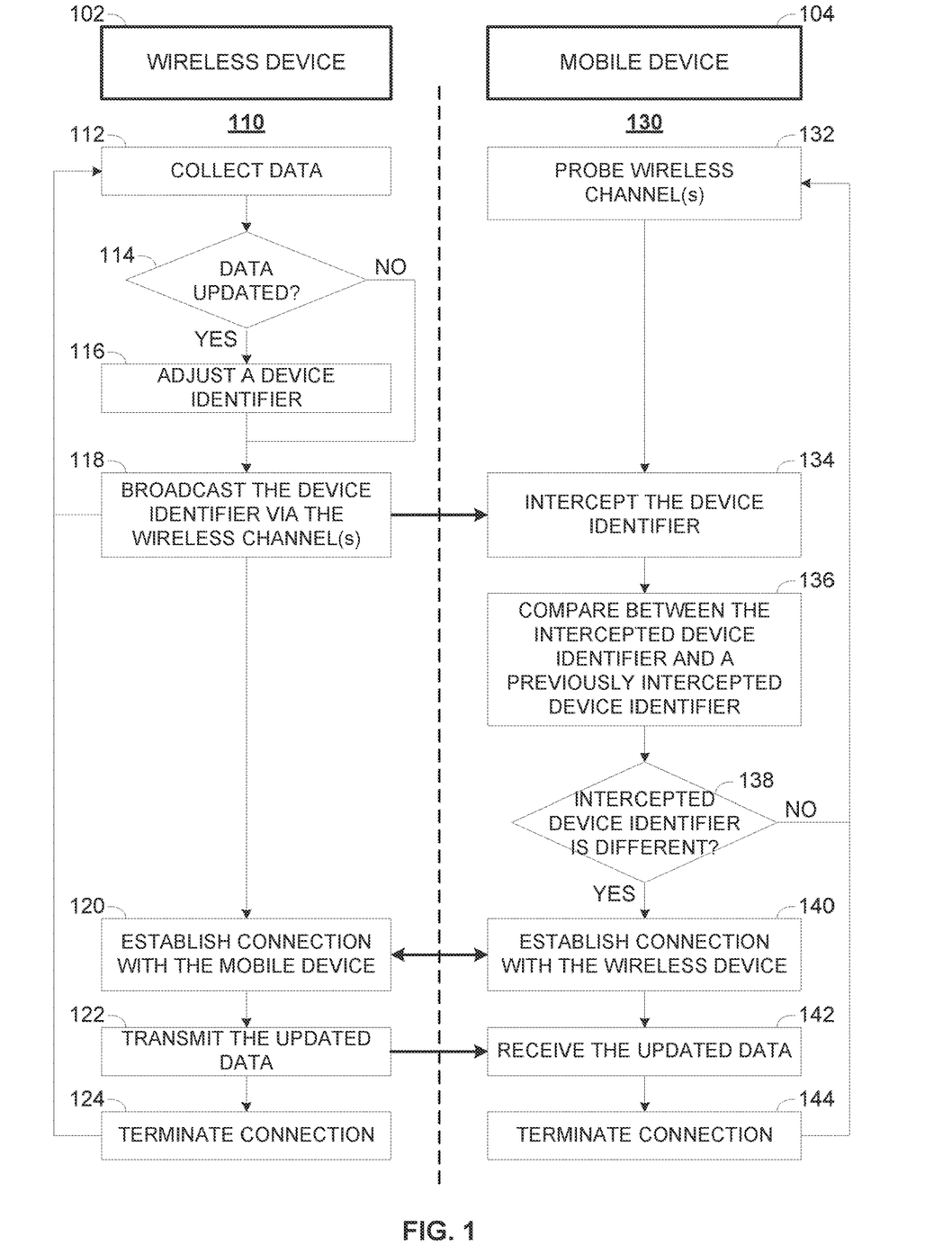
FIG. 1 presents flowcharts of exemplary processes executed by a wireless device and a mobile device for wirelessly broadcasting and detecting data indicative of updated data available at the wireless device, according to some embodiments of the present invention.

Referring now to the drawings, FIG. 1 presents flowcharts of exemplary processes executed by a wireless device and a mobile device for wirelessly broadcasting and detecting data indicative of updated data available at the wireless device, according to some embodiments of the present invention.

An exemplary process 110 may be executed by a wireless device 102 for collecting data and transferring it to one or more mobile devices 104 via one or more wireless channels. The wireless device 102 may broadcast, via the wireless channel(s), a device identifier which may be adjusted to indicate of the collected data that is currently available at the wireless device 102.

An exemplary process 130 may be executed by each of one or more mobile devices 104 for communicating with the wireless device 102 to receive (obtain) the data available at the wireless device 102. Specifically, each mobile device 104 may be configured to probe the wireless channel(s) and, when in a transmission range of the wireless device 102, intercept the indicative data broadcasted by the wireless device 102 without establishing a communication session with the wireless device 102.

The mobile device 104 may compare the intercepted indicative data to previously intercepted indicative data associated with previous data that was previously available at the wireless devices 102 in order to determine whether updated (new) data is currently available at the wireless device 102 compared to the previous data. Assuming the previous data was already received by the mobile device 104, only when the mobile device 104 determines that updated data is available at the wireless device 102 the mobile device 104 may establish a connection and communicate with the wireless device 102 to receive the updated data. Otherwise, since no updated data is available, the mobile device 104 may avoid connecting and communicating with the wireless device 102.

Figure 2A:
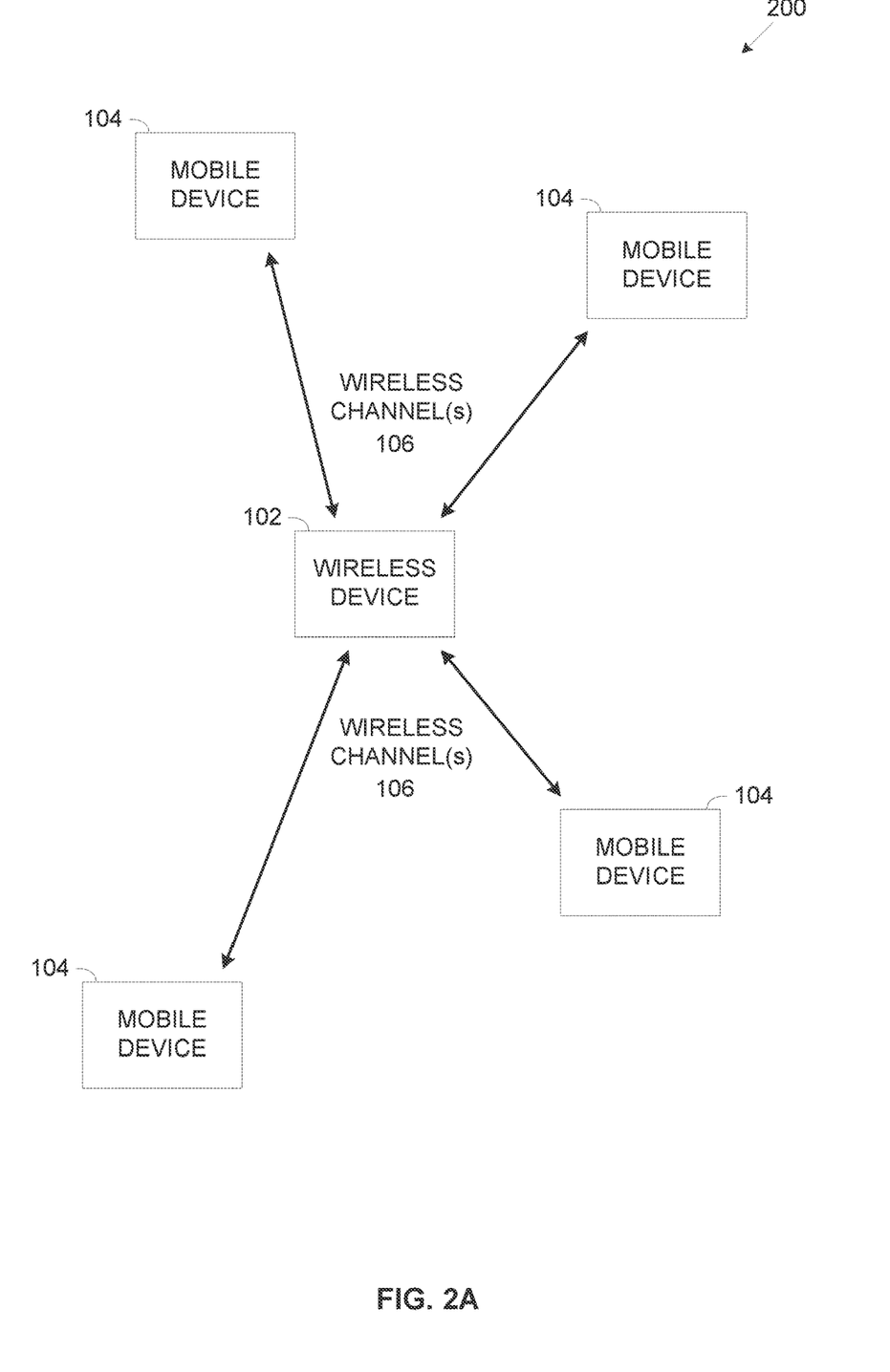
FIG. 2A and FIG. 2B are schematic illustrations of an exemplary system comprising a wireless device configured to broadcast data indicative of updated data available at the wireless device and one or more mobile devices configured to detect the indicative data and communicate with the wireless device to acquire the updated data, according to some embodiments of the present invention.
Figure 2B:
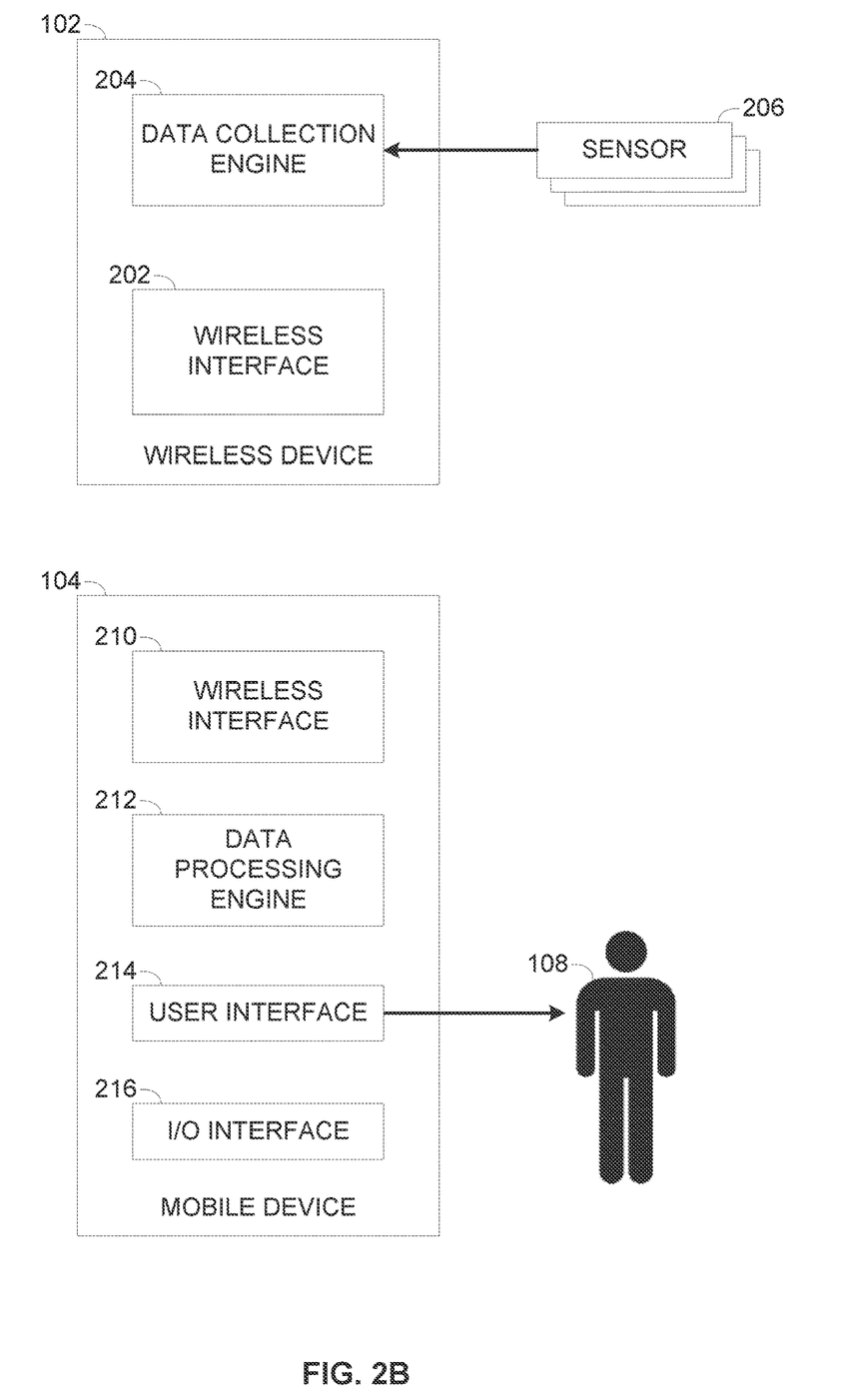

Reference is also made to FIG. 2A and FIG. 2B which are schematic illustrations of an exemplary system comprising a wireless device configured to broadcast data indicative of updated data available at the wireless device and one or more mobile devices configured to detect the indicative data and communicate with the wireless device to acquire the updated data, according to some embodiments of the present invention.

An exemplary system 200 may include a wireless device 102, for example, a data collection device, a sensing device, an IoT device and/or the like configured to communicate with one or more other devices via one or more wireless channels 106. In particular, the wireless channel(s) 106 may include short range, close proximity wireless channels 106 configured to operate in a limited range, for example, between a few meters and few tens of meters. The wireless channel(s) 106 may include, for example, Bluetooth, BLE, ZigBee, Z-WAVE, WLAN (e.g. Wi-Fi) and/or the like.

For example, the wireless device 102 may communicate with one or more mobile devices 104 typically but not necessarily associated with one or more users 108 and are thus mobile since they are held, worn and/or otherwise carried by the users. The mobile devices 104 may therefore include client devices typically uniquely associated with users, for example, a Smartphone, a Smartwatch, a wearable device, a Radio Frequency Identification (RFID) tag, a proprietary device and/or the like. However, the mobile devices 104 may further mobile devices which are not private and are not necessarily uniquely associated with users, for example, a key holder, a proprietary device specifically designed for communicating with wireless device such as the wireless device 102 and/or the like.

The wireless device 102 may communicate with each mobile device 104 via on one or more of the wireless channel(s) 106 typically established Ad hoc to directly connect between the two wireless devices. Such Ad hoc connection may be a common mode of operation for at least some of the wireless channels 106, for example, Bluetooth, BLE, Zig-Bee and even direct Wi-Fi. However, the wireless device 102 may optionally communicate with one or more of the mobile devices 104 via an infrastructure network, for example, a Wi-Fi network established using one or more infrastructure devices and/or equipment, for example, a router, a gateway and/or the like.

For brevity, the system 200 is presented and described for only a single wireless device 102. This, however, should not be construed as limiting since a plurality of wireless device 102 may be deployed and configured to communicate with one or more other wireless devices such as the mobile devices 104.

The wireless device 102 may be deployed to collect data, for example, sensory data, imagery data, audible data and/or the like captured by one or more sensors and/or other sensing devices which are communicatively coupled to the wireless device 102.

The mobile device 104 typically associated with a user 108 may communicate with the wireless device 102 to obtain, for example, receive, fetch, collect and/or the like at least some of the data collected by the wireless device 102. The mobile device 104 may process the data and may further initiate one or more actions accordingly. For example, the mobile device 104 may be configured to generate one or more events based on the content of the data received from the wireless device 102 and/or based on analysis of the received data. The mobile device 104 may be further configured to initiate one or more actions, for example, generate an indication, an alert, a notification and/or the like to notify the user(s) 108 of one or more of the events.

According to some embodiments, the wireless device 102 may be deployed to support one or more child safety applications, for example, child detection, child vital signs monitoring and/or the like. The wireless device 102 may be therefore designed, configured and/or operated to collect data relating to one or more children located in one or more locations, specifically in one or more child hosting apparatuses configured to host one or more children. Such child hosting apparatuses may include, for example, a car child seat, a car seat, a stroller, a crib, a child walker, a trampoline and/or the like.

The exemplary child hosting apparatuses mentioned herein should not be construed as limiting since wireless devices such as the wireless device 102 may be deployed to support one or more of the child safety applications for in practically any child hosting apparatus capable in which one or more children may be located, present and/or hosted.

In such embodiments, the wireless device 102 may be deployed in, near and/or around the child hosting apparatus and may be configured to detect and monitor presence and/or safety of a child hosted in the child hosting apparatuses based on data captured by one or more sensors 206 deployed in, near and/or around the child hosting apparatus.

For example, the wireless device 102 may communicate with one or more contact and/or proximity sensors 206, for example, a proximity sensor, a magnetic field sensor, a microswitch, a pressure sensor, a discrete Hall Effect sensor, a reed switch and/or the like deployed in a car child seat to collect sensory data indicative whether one or more Isofix connectors of the child seat are latched onto corresponding fittings on the seat which may be indicative of a child sitting in the seat.

Moreover, based on the sensory data received from the contact and/or proximity sensors 206, the wireless device 102 may further determine whether the Isofix connector(s) of the car child seat are properly and/or securely latched onto the corresponding fittings.

In another example, the wireless device 102 may collect data captured by one or more of contact and/or proximity sensors 206 deployed to determine whether one or more seat belts of the vehicle have been passed through respective one or more seat belt guides of the car child seat and optionally if the seat belts are securely buckled.

In another example, the wireless device 102 may connect to one or more pressure sensors 206 deployed in the car child seat which are configured to measure pressure on the seat. Based on the pressure measurements captured by the pressure sensor(s) 206, the wireless device 102 may determine and/or identify whether a child is present in the car child seat or not.

In another example, the wireless device 102 may be deployed in a vehicle to monitor presence of one or more children in the vehicle, in particular in the back seat(s) of the vehicle. In such case, the wireless device 102 may connect to one or more sensors 206 such as the pressure sensor deployed to measure pressure on one or more of the back seats. Based on the pressure measurements captured by the pressure sensor(s) 206, the wireless device 102 may identify whether one or more people are sitting in the back seat. Moreover, based on calculation of the weight of the person(s) sitting in the back seat compared to a predefined threshold indicative of a child's weight, the wireless device 102 may determine whether each of the detected person(s) is a child or not. In another example, the wireless device 102 collect imagery data captured by one or more imaging sensors 206 deployed in the vehicle to monitor the back seat and may analyze the imagery data to identify one or more people, specifically children seating in the back seat.

In another example, the wireless device 102 may be deployed in a stroller, a crib and/or the like to detect and monitor presence of a child in the stroller or the crib. In such case, the wireless device 102 may connect to pressure sensors 206 deployed and configured to measure pressure a sitting and/or lying surface of the stroller, the crib and/or the like. Based on the pressure measurements captured by the pressure sensor(s) 206, the wireless device 102 may identify whether a child is present in the stroller, the crib and/or the like.

In another example, the wireless device 102 may be deployed to monitor one or more vital life signs, for example, breathing, body temperature, heartbeat and/or the like of one or more children located in one or more of the child hosting apparatuses. In such case, the wireless device 102 may collect vital life signs data captured by one or more sensors 206 deployed and configured as known in the art to measure one or more of the vital life signs of one a child present in the child hosting apparatus. The wireless device 102 may optionally process and/or analyze the sensory data to determine a status of the monitored child based on the measured vital signs.

In another example, the wireless device 102 may determine whether the vehicle in which a child is seating in a car child seat is moving or not based on motion data captured by one or more motion sensors 206 deployed in the vehicle and/or in the seat, for example, a gyroscope, an accelerometer and/or the like In such embodiments, the mobile devices 104 associated with one or more users 108 caring and/or attending to the child(s), for example, a parent, a nanny, a baby-sitter, a nurse, a guardian and/or the like may include one or more devices which are in common and/or applicable use the associated user(s) 108. Typically, the mobile device 104 may include smart devices used by the user(s) 108 such as, for example, a Smartphone, a Smartwatch, a wearable device and/or the like. However, the mobile device 104 may include one or more application specific mobile devices used by the user(s) 108, for example, an RFID tag, a key chain, a key holder and/or the like.

The mobile device 104 may communicate with the wireless device 102 to receive the data relating to the child(s) that was collected by the wireless device 102. Based on the content of the received data and/or based on analysis of the received data, the mobile device 104 may generate one or more events relating to the child(s). The mobile device 104 may be further configured to initiate one or more actions, for example, generate an indication, an alert, a notification and/or the like to notify the person(s) 108 of one or more of the events relating to the child(s).

The wireless device 102 may include, a wireless interface 202 for connecting to one or more of the wireless channels 106, for example, Bluetooth, BLE, Zig-Bee, WLAN and/or the like, and a data collection engine 204 for executing the process 110.

Via the wireless interface 202, the wireless device 102 may communicate with one or more other devices, for example, one or more of the mobile devices 104.

The data collection engine 204 may be configured to collect data, for example, sensory data captured by one or more sensors 206, for example, a pressure sensor, a proximity sensor, a contact sensor, an imaging sensor, an audio sensor and/or the like. Each of the sensor(s) 206 may be therefore communicatively coupled to the wireless device 102, specifically to the data collection engine 204 via one or more wired and/or wireless connections, for example, a serial channel, a Universal Serial Bus (USB) port, a Radio Frequency (RF) channel and/or the like. optionally, one or more of the sensor(s) 206 are integrated in the mobile device 102.

Optionally, the data collection engine 204 may be further configured to process and/or analyze the collected data and/or part thereof.

The data collection engine 204 may be implemented, utilized and/or facilitated using one or more technologies, architectures and/or modes as known in the art. For example, the data collection engine 204 may be utilized by one or more software modules, for example, a process, a script, an application, an agent, a utility, a tool, an Operating System (OS) and/or the like each comprising a plurality of program instructions stored in a non-transitory medium (program store), for example, a storage media (e.g. Read Only Memory (ROM), Flash array, etc.) included in the wireless device 102 and executed by one or more processors and/or controllers of the wireless device 102. In another example, the data collection engine 204 may be utilized using one or more hardware elements (modules) integrated, utilized and/or otherwise available in the wireless device 102, for example, a circuit, a component, an Integrated Circuit (IC), an Application Specific Integrated Circuit (ASIC), a Field Programmable Gate Array (FPGA), a Digital Signals Processor (DSP), and/or the like. In another example, the data collection engine 204 may be utilized by a combination of one or more software modules and one or more of the hardware modules.

Each mobile device 104 may include a wireless interface 210 such as the wireless interface 202 for connecting to one or more of the wireless channels 106, for example, Bluetooth, BLE, ZigBee, Z-WAVE, WLAN and/or the like, a data processing engine 212 for executing the process 130, a user interface 214 for interacting with one or more associated users 108 and optionally an Input/Output (I/O) interface 216.

Via the wireless interface 210, the mobile device 104 may communicate with one or more other devices, for example, the wireless device 102 in order to receive the data collected by the wireless device 102, for example, the sensory data and/or data derived from the sensory data.

The data processing engine 212 may be configured to process data, specifically the data received from the wireless device 102, for example, the sensory data captured by one or more of the sensor(s) 206 and/or data derived from the captured sensory data. Based on the content of the received data and/or based on analysis of the received data, the data processing engine 212 may generate one or more events relating to the data collected by the wireless device 102, for example, the sensory data. The data processing engine 212 may further initiate one or more actions to report of the generated events, for example, generate an indication, an alert, a notification and/or the like to notify the user(s) 108 of one or more of the events.

As described for the data collection engine 204, the data processing engine 212 may be implemented, utilized and/or facilitated using one or more of the technologies, architectures and/or modes known in the art. For example, the data processing engine 212 may be utilized by one or more software modules, for example, a process, a script, an application, an agent, a utility, a tool, an OS and/or the like each comprising a plurality of program instructions stored in a storage media of the mobile device 104 and executed by one or more processors, homogenous or heterogeneous, of the mobile device 104. In another example, the data processing engine 212 may be utilized using one or more hardware modules integrated, utilized and/or otherwise available in the mobile device 104, for example, a circuit, a component, an IC, an ASIC, an FPGA, a DSP, a Graphic Processing Unit (GPU) and/or the like. In another example, the data processing engine 212 may be utilized by a combination of one or more software modules and one or more of the hardware modules.

The user interface 214 may include one or more Human-Machine Interfaces (HMI) for interacting with the user 108, in particular, for alerting the user 108 of one or more of the events generated by the data processing engine 212. For example, the user interface 214 may include one or more visual output HMIs, for example, a screen, one or more light sources such as, for example, a Light Emitting Diode (LED) and/or the like for generating one or more visual indications, notifications and/or alerts directed to notify the user 108 of one or more of the events. In another example, the user interface 214 may include one or more audio output HMIs, for example, a speaker, a buzzer, a piezo and/or the like for generating one or more audible indications, notifications and/or alerts directed to notify the user 108 of one or more of the events. In another example, the user interface 214 may include one or more tactile HMIs, for example, a vibrating element and/or the like for generating one or more motion indications and/or alerts directed to notify the user 108 of one or more of the events.

The optional I/O interface 216 may include one or more wired and/or wireless interfaces configured to connect to one or more channels, networks, interconnections and/or the like for communicating with one or more other devices. For example, the I/O interface 216 may include one or more long range wireless interfaces for connecting to one or more wireless networks, for example, a cellular network and/or the like such that the mobile device 104 may connect to one or more remote servers, cloud services, cloud resources and/or the like via one or more networks, for example, the internet. In another example, the I/O interface 216 may include one or more wired and/or wireless interfaces through which the mobile device 104 may connect to one or more other device and relay the events and/or indications to the other device(s). For example, the mobile device 104 may be configured as an add-on device attachable to one or more other devices, for example, a Smartphone. In such case, the mobile device 104 may communicate with the Smartphone via one or more interfaces provided by the I/O interface 216, for example, USB, Near-Field Communication (NFC), RF and/or the like.

The processes 110 and 130 are described for the single wireless device 102. This however, should not be construed as limiting since one or more of the mobile devices 104 may each initiate a respective process 130 to communicate with a plurality of wireless devices such as the wireless device 102 to receive updated data collected by the respective wireless device 102 executing a respective process 110.

Complementary, while the processes 110 and 130 are described for a wireless device 102 interacting with a single mobile device 104, the wireless device 102 may execute a plurality of processes 110 each for interacting and communicating with a respective one of a plurality of mobile devices 104 in order to provide updated data to each of the mobile devices 104. Specifically, since the wireless channel 106 may typically support a single connection with a single mobile device 104 at every given time, after completing a process 110 with a first mobile device 104 by terminating the connection, the wireless device 102 may initiate another process 110 for communicating with a second mobile device 104.

For brevity, the description herein states that the process 110 is executed by the wireless device 102. It should be noted however, that in practice the process 110 may be executed by the data collection engine 202 executed by the wireless device 102. Similarly, the description herein states that the process 130 is executed by the mobile device 104. It should be noted however, that in practice the process 130 may be executed by the data processing engine 212 executed by the mobile device 104.

Also, while for brevity the wireless device 102 and the mobile device 104 described in the processes 110 and 130 may communicate via a single wireless channel 106, the wireless device 102 and the mobile device 104 may optionally communicate and/or interact with each other via multiple wireless channels 106.

The wireless device 102 and the mobile device 104 may initiate the processes 110 and 130 respectively independently of each other such that the one or both of the devices may execute at least some steps of their respective processes independently of each other.

However, some of the steps of the processes 110 and 130 require interaction and potentially communication between the wireless device 102 and the mobile device 104. As described herein before, the transmission range of the wireless channel 106 used for communication between the wireless device 102 and the mobile device 104 to communicate with each other may be limited to a certain distance, for example, few meters, only when the wireless device 102 and the mobile device 104 are within the certain distance from each other, i.e., the certain distance, for example, 10 meters.

Therefore, only when the mobile device 104 and the wireless device 102 are within the certain distance of each other, for example, 10 meters, the wireless device 102 and the mobile device 104 may establish a connection and communicate with each other via the wireless channel 106 and execute the steps of the processes 110 and 130 that require interaction and communication.

As shown at 112, the process 110 executed by the wireless device 102 may start with the wireless device 102 collecting data.

For example, the wireless device 102 may communicate with one or more of the sensor(s) 206 to collect sensory data captured by the sensor(s) 206, for example, pressure readings, proximity measures, imagery data and/or the like.

In particular, in case the wireless device 102 is deployed to support one or more of the child safety applications, the wireless device 102 may communicate with one or more sensors 206 deployed in, near and/or around one or more of the child hosting apparatuses which are configured to capture sensory data relating to one or more children located and/or present in the child hosting apparatus(s).

Moreover, the wireless device 102 may generate data based on the sensory data collected from the sensor(s) 206.

For example, assuming the sensor(s) 206 deployed in the child hosting apparatus comprise one or more pressure sensors 206, the wireless device 102 may determine whether a child is located in the child hosting apparatus or not. Moreover, based on the captured pressure readings, the wireless device 102 may further compute a weight of the child seating and/or located in the child hosting apparatus.

The wireless device 102 may further determine whether the collected data is new, i.e., updated compared to previously collected data.

For example, assuming the wireless device 102 collects sensory data captured by the sensor(s) 206, the wireless device 102 may compare the collected sensory data to previous sensory data previously captured by the sensor(s) 206. Moreover, the wireless device 102 may optionally generate updated data, for example, updated presence data relating to a child located in the child hosting apparatus, weight data based on updated sensory data captured by the pressure sensor(s) 206 deployed in the child hosting apparatus and/or the like.

Optionally, one or more of the sensor(s) 206 may include one or more status mechanisms and/or indicators, for example, a status register, a status signal, an interrupt signal and/or the like which may be operated by the sensor(s) 206 to indicate the wireless device 102 that new sensory data is available. In such case, the wireless device 102 may first determine, based on the status mechanisms and/or indicators, whether updated sensory data is available and in case such updated sensory data is available, the wireless device 102 may communicate with the sensor(s) 206 to collect the updated sensory data.

As shown at 114, which is a conditional step, the process 110 may branch to 116 in case the wireless device 102 determines that the collected data comprises updated data compared to previously collected data. Otherwise, the process 110 may branch to 118 in case the wireless device 102 determines that the collected data is not updated compared to previously collected data.

As shown at 116, the wireless device 102 may adjust a device identifier of the wireless device 102. In particular, the adjusted identifier computed by the wireless device 102 is associated with the updated data and is therefore indicative of availability of the updated data compared to previous data that was previously available at the wireless device 102 which was associated with a different, pre-adjustment, device identifier.

Each wireless device, for example, the wireless device 102 and the mobile device 104 using the wireless channel 106 may typically broadcast a device identifier via one or more of the wireless channel 106. The device identifier broadcasted by the wireless device 102 may be defined by one or more communication protocols applicable for the wireless channel 106 as known in the art to uniquely and deterministically identify each device communicating via the wireless channel 106. Each wireless device may broadcast its device name and device identifier, continuously, periodically and/or on demand as defined by the applicable communication protocol(s).

The device identifier may include a fixed part to uniquely and deterministically identify the wireless device 102, for example, a network identifier such as, for example, a Media Access Controller (MAC) Address which is fixed and unique for each device, an Internet Protocol (IP) address which may be unchangeable at least the duration of the communication session and/or the like.

However, the device identifier of one or more of the wireless devices may comprise an adjustable part, for example, a device name, a device status and/or the like which may be dynamically changed and/or adjusted by the respective wireless device, for example, the wireless device 102.

The wireless device 102 may therefore adjust the adjustable part of its device identifier, for example, its device name, its device status and/or the like to indicate availability of the updated data. Specifically, the adjustable part of the device identifier associated with the updated data may be adjusted to be different from the adjustable part of a previous device identifier of the wireless device 102 which was associated with data that was previously available at the wireless device 102. The different device identifier, specifically the different adjustable part of the device identifier may therefore indicate that the updated data currently available at the wireless device 102 is different from the previously available data.

Adjusting the adjustable part of the device identifier to indicate data availability may be implemented using a plurality of method and/or techniques, optionally according to the communication protocol(s) applicable for the wireless channel 106. For example, assuming the adjustable part of the device identifier of the wireless device 102, for example, the device name is defined to include a total of 8 characters, the first four characters may identify a type of the wireless device 102, for example, WDT1 (Wireless Device Type 1) and the last four characters may be incremented every time new (updated) data is available at the wireless device 102.

In such case, a first device name may comprise a value WDT10000, a second device name adjusted after updated data is available at the wireless device 102 may comprise a value WDT10001 and so on.

Optionally, the adjustable part of the device identifier may be indicative of at least part of a content of the data available at wireless device 102. As such, every time the wireless device 102 collects updated data, the wireless device 102 may adjust adjustable part of its device identifier based on the content of the updated data to indicate availability of the updated data. In other words, when data available at the wireless device 102 is updated compared to previously available data, the content of the updated data is essentially different from the content of the previously available data. The device identifier's adjustable part derived from the content of the updated data may be therefore different from the adjustable part a previous device identifier derived from the content of the previously available data.

For example, assuming the wireless device 102 is deployed to support one or more of the child safety applications and configured to collect sensory data from one or more sensors 206 deployed in the child hosting apparatus, for example, a car child seat. Further assuming the adjustable part of the device identifier of the wireless device 102 is defined to have a total of 8 characters. In such case, the first four characters may identify the type of the wireless device 102, for example, WDT1, a fifth character may indicate whether a child is seating in the car child seat and the last three characters may be incremented every time updated data is available at the wireless device 102.

Optionally, the adjustable part of the device identifier may comprise a signature computed based on content of the data available at wireless device 102. For example, the signature computed by the wireless device 102 may comprise a checksum computed by the wireless device 102 for the content of the updated data and/or part thereof. In another example, the signature computed by the wireless device 102 may comprise a hash value computed by the wireless device 102 using one or more hash functions based on the content of the updated data and/or part thereof. For example, assuming the adjustable part of the device identifier of the wireless device 102 is defined to have a total of 8 characters, where the first four characters may identify a type of the wireless device 102, for example, WDT1, the fifth character is reserved and the last three characters comprise the signature computed for the data available at the wireless device 102.

Optionally, the wireless device 102 creates a log record comprising a plurality of data items and/or datasets collected by the wireless device 102 and accumulated over time. For example, assuming the wireless device 102 collects the sensory data from the sensor(s) 206, the wireless device 102 may create a log record comprising a plurality of sensory datasets captured by the sensor(s) 206 and accumulated in the wireless device 102 during a certain time, for example, a certain recent time period and/or the like.

Optionally, one or more of the data items and/or datasets collected by the wireless device 102 are time stamped to indicate their time of capture and/or creation. The time stamp may be included in the data available at the wireless device 102 in association with the data item for which it was created. The collected data may be time stamped by the wireless device 102 itself and/or by one or more other devices, for example, one or more of the sensors 206.

As shown at 118, the wireless device 102 may broadcast its device identifier comprising the fixed part uniquely identifying the wireless device 102 and the adjustable part which may be indicative of data available at the wireless device 102.

The wireless device 102 may repeat steps 112-118 in a plurality of iterations to collect data and check whether the collected data is new and updated compared to previously collected data and may adjust its device identifier name accordingly if needed, in particular the adjustable part of its device identifier.

As shown at 132, the process 130 executed by the mobile device 104 may start with the mobile device 104 probing the wireless channel 106 in attempt to detect one or more wireless devices 102.

As stated herein before, the wireless device 102 and the mobile device 104 may initiate their respective processes 110 and 130 independently of each other. In particular, the wireless device 102 may execute steps 112-118 of the process 110 to check and collect updated data, adjust its device identifier accordingly and broadcast it via the wireless channel 106 independently of the mobile device 104 which may probe the wireless channel 106 in attempt to detect the wireless device 102, specifically the device identifier broadcasted by the wireless device 102.

The mobile device 104 may apply one or more operation modes for probing the wireless channel 106. For example, the mobile device 104 may continuously probe the wireless channel 106. In another example, the mobile device 104 may probe the wireless channel 106 periodically every predefined time period, for example, 0.25 seconds, 0.5 seconds, 1 second, and/or the like.

The mobile device 104 may apply one or more methods, techniques and/or implementations for probing the wireless channel 106 in attempt to detect the wireless device(s) 102 including, for example, operating the wireless interface 210 to probe the wireless channel 106, intercepting data from the wireless channel 106, analyzing the intercepted data and/or the like.

For example, assuming the mobile device 104 is a simple device implementing the data processing engine 212 in hardware and/or using simplistic embedded software. In such case, the data collection engine 202 may operate and/or execute one or more hardware and/or software modules to operate the wireless interface 210 to continuously and/or periodically probe the wireless channel 106, intercept data from the wireless channel 106 and analyze the intercepted data.

In another example, assuming the mobile device 104, for example, a Smartphone executes an OS such as, for example, Android and/or the like configured to support constantly active services. In such case the data processing engine 212 may employ one or more constantly active services executed by the mobile device 104 in a foreground environment of the OS to probe the wireless channel 106. Using the constantly active service(s), the data processing engine 212 may operate the wireless interface 210 to continuously and/or periodically probe the wireless channel 106 and intercept data from the wireless channel 106.

In another example, assuming the mobile device 104, for example, a Smartphone executes an OS such as, for example, iOS and/or the like which do not support constantly active services. In such case the data processing engine 212 may use one or more services provided by the OS, for example, a beacon detection service configured to continuously and/or periodically probe the wireless channel and detect one or more beacon signals transmitted by one or more wireless devices via the wireless channel 106. The beacon detection service executed by the OS may be configured to invoke one or more inactive services in response to detection of one or more such beacon signals. The invoked service(s) may be then used to continuously and/or periodically probe the wireless channel 106 and intercept data transmitted via the wireless channel 106 by one or more of the wireless devices.

As shown at 134, the mobile device 104 may intercept the device identifier of the wireless device 102 comprising the fixed part uniquely identifying the wireless device 102 and the adjustable part which may be indicative of data available at the wireless device 102.

It should be noted that since the wireless device 102 may independently broadcast its device identifier, intercepting the device identifier of the wireless device 102 does not require the mobile device 104 to establish a connection with the wireless device 102 and/or otherwise communicate with the wireless device 102 in any way.

Since the transmission range of the wireless device 102 via the wireless channel 106 may be limited to the certain distance, for example, few meters (e.g. 10, 20, 50 meters), the mobile device 104 may intercept the device identifier broadcasted by the wireless device 102 only when the mobile device 104 is within the certain distance from the wireless device 102, for example, 10, 20, 50 meters. However, while the mobile device 104 is further away from the wireless device 102, i.e. more than the certain distance from the wireless device 102, the mobile device 104 may be outside the transmission range of the wireless device 102 and may be thus unable to intercept the device identifier broadcasted by the wireless device 102 via the wireless channel 106.

Therefore, since the mobile device 104 may be able to intercept the data broadcasted by the wireless device via the wireless channel 106, for example, the device identifier only when the mobile device 104 is in the transmission range of the wireless device 102, the mobile device 104 may detect moving in and out of the transmission range of the wireless device 102. Since such movement of the mobile device 104 in and out of the transmission range of the wireless device 102 may be interpreted as moving towards and away from the wireless device 102 respectively, the mobile device 104 may determine whether it is moving closer to or further away from the wireless device 102.

Optionally, the mobile device 104 may be configured to generate one or more events in response to detecting that the mobile device 104 is in the transmission range of the wireless device 102. For example, the mobile device 104 may generate one or more events when first entering the transmission range of the wireless device 102 in response to detecting, for the first time compared to recent probing of the wireless channel 106, the device identifier broadcasted by the wireless device.

Optionally, the mobile device 104 may be configured to generate one or more events in response to detecting that the mobile device 104 is out of the transmission range of the wireless device 102. For example, the mobile device 104 may generate one or more events when exiting the transmission range of the wireless device 102 after previously located within the transmission range based on in ability to intercept the device identifier broadcasted by the wireless device compared to recent probing of the wireless channel 106 in which the device identifier was successfully intercepted.

Moreover, the mobile device 104 may be configured to generate one or more visual, audible and/or tactile indications, notifications and/or alerts in response to one or more of the events, for example, detecting one or more nearby wireless device 102, moving further away from one or more of the nearby wireless device(s) 102 beyond the certain distance and/or the like.

In particular, in case the wireless device 102 is deployed in one or more of the child hosting apparatuses to support one or more of the child safety applications and is configured to collect sensory data from one or more sensors 206 deployed to capture sensory data relating to one or more children located and/or present in the child hosting apparatus(s). In such case, the events generated by the mobile device 104 may comprise one or more child safety related events identified based on the updated data received from the wireless device 102, typically based on the sensory data captured by one or more of the sensor(s) 206 deployed to capture sensory data relating to the one or more children.

For example, the mobile device 104 may generate one or more alerts, indications and/or notifications when moving away from the wireless device 102 to alert the user(s) 106 that a child may be left in the child hosting apparatus, for example, the child seat. In another example, the mobile device 104 may generate one or more alerts, indications and/or notifications when getting closer and detecting a wireless device 102 deployed in a child hosting apparatus, for example, a car child seat to indicate to the user(s) 106 that a connection was established with the wireless device 102. In another example, the mobile device 104 may generate one or more alerts, indications and/or notifications in case one or more of the vital signs of a child located in a child hosting apparatus (e.g. crib, stroller, etc.) exceed predefined values. In another example, the mobile device 104 may generate one or more alerts, indications and/or notifications in case the vehicle in which a child is seating in a car child seat is moving. In another example, the mobile device 104 may generate one or more alerts, indications and/or notifications in case a child is not properly positioned in the child hosting apparatus, for example, in case one or more Isofix and/or straps of a car child seat are not properly secured and/or strapped.

Figure 3:
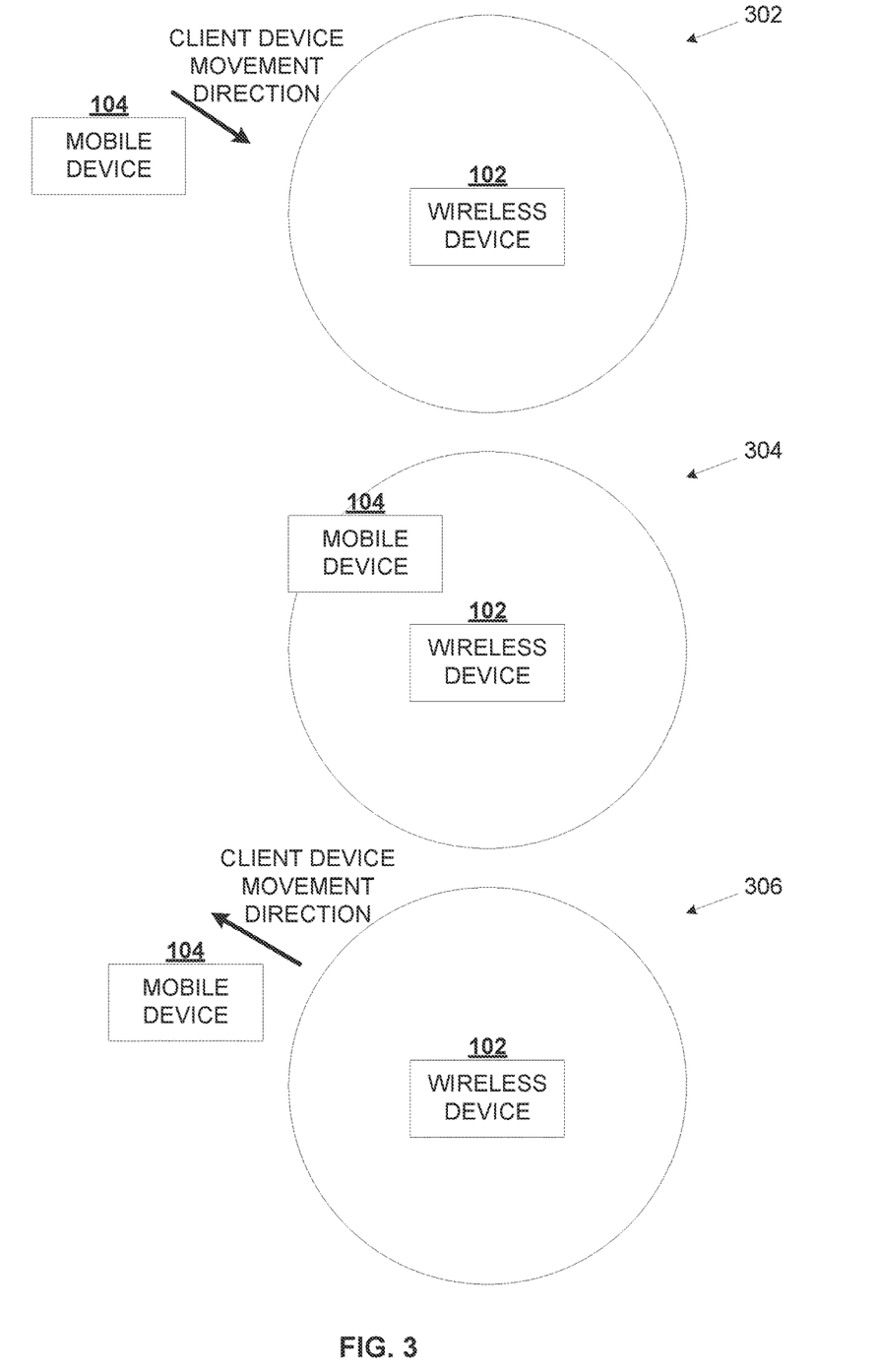
FIG. 3 presents schematic illustrations of exemplary positioning scenarios of a mobile device with respect to a wireless device according to which the mobile device may initiate one or more actions, according to some embodiments of the present invention.

Reference is now made to FIG. 3, which presents schematic illustrations of exemplary positioning scenarios of a mobile device with respect to a wireless device according to which the mobile device may initiate one or more actions, according to some embodiments of the present invention.

Illustrations 302, 304 and 306 present a sequence of movement of a mobile device such as the mobile device 104 towards a wireless device such as the wireless device 102.

As seen in 302, the mobile device 104 which is moving towards the wireless device 102 is out of the transmission range (coverage area) of one or more wireless channels such as the wireless channel 106 of the wireless device 102. The mobile device 104 is therefore unable to intercept the device identifier broadcasted by the wireless device 102 via the wireless channel 106 and may thus not detect the wireless device 102.

As seen in 304, the mobile device 104 moving closer to the wireless device 102 enters the transmission range of the wireless device 102 via the wireless channel 106. The mobile device 104 may therefore intercept the device identifier broadcasted by the wireless device 102 via the wireless channel 106 and may detect the wireless device 102.

As seen in 306, the mobile device 104 moving away from the wireless device 102 exits the transmission range of the wireless device 102 via the wireless channel 106. The mobile device 104 may therefore again be unable to intercept the device identifier broadcasted by the wireless device 102 via the wireless channel 106 and may therefore be unable to detect the wireless device 102.

The mobile device 104 may generate one or more events to reflect detection of the wireless device 102 and/or inability to detect the wireless device 102 which are indicative of the distance between the mobile device 104 and the wireless device 102. The wireless device 102 may further initiate one or more actions, for example, generate an alert, an indication and/or the like to indicate moving closer and/or further from the wireless device 102 based on the presence and/or absence of data transmission (broadcasting) originating from the wireless device 102

Reference is made once again to FIG. 1.

As shown at 136, the mobile device 104 may compare between the intercepted device identifier of the wireless device 102 and a previously intercepted device identifier of the wireless device 102, specifically a most recently intercepted device identifier. In particular, the mobile device 104 may compare between the adjustable part of the intercepted device identifier and the adjustable part of the previously intercepted device identifier.

While the (currently) intercepted device identifier and the previously intercepted device identifier may be slightly different due to their possibly different adjustable parts, the mobile device 104 may use the fixed part of the device identifier to correlate the currently intercepted device identifier and the previously intercepted device identifier with the same wireless device 102.

In other words, the mobile device 104 may identify the wireless device 102 based on the fixed part of its device identifier which is identical during all device identifier broadcasts made by the same wireless device 102. After correlating the currently and previously intercepted device identifiers with the same wireless device 102, the mobile device 104 may compare the values of the adjustable parts of the currently and previously intercepted device identifiers.

As shown at 138, which is a conditional step, the process 130 may branch to 140 in case the intercepted device identifier of the wireless device 102 is different from the previously intercepted device identifier of the wireless device 102, specifically in case the adjustable part of the intercepted device identifier is different from the adjustable part of the previously intercepted device identifier. Otherwise, in case the adjustable part of the intercepted device identifier of the wireless device 102 is similar to the adjustable part of the previously intercepted device identifier of the wireless device 102, the process 130 may branch back to 132 to continue probing the wireless channel 106.

As described herein before, the difference in the intercepted device identifier compared to the previously intercepted device identifier may be indicative of updated data available at the wireless device 102. In particular, it is assumed that the mobile device 104 already received the data which was available at the wireless device 102 and was associated with the previously intercepted device identifier.

Therefore, in case the currently intercepted device identifier is the same as the previously intercepted device identifier, the mobile device 104 may determine that no updated data is available for it at the wireless device 102. However, in case the currently intercepted device identifier, specifically the adjustable part of the currently intercepted device identifier is different from the adjustable part of the previously intercepted device identifier, the mobile device 104 may determine that there is updated data available at the wireless device 102.

In case the device identifier is the same, the mobile device 104 may go back to 132 and continue probing the wireless channel 106 for one or more purposes, for example, detect a change in the device identifier of the wireless device 102, detect leaving the transmission range of the wireless device 102, detect one or more other wireless devices 102 and/or the like.

As shown at 120 of the process 110 and complementary at 140 of the process 130, the mobile device 104 may establish a connection with the wireless device 102 via the wireless channel 106 according to one or more of the communication protocols applicable for the wireless channel 106 as known in the art.

As shown at 122 of the process 110 and complementary at 142 of the process 130, the wireless device 102 may transmit the updated data to the mobile device 104 receiving the updated data.

Optionally, in case the wireless device 102 creates the log record comprising the plurality of data items and/or datasets collected and accumulated at the wireless device 102 over time, the mobile device 104 may communicate with the wireless device 102 to receive the log record and/or part thereof. Specifically, the mobile device 104 may interact with the wireless device 102 to obtain one or more data items and/or datasets collected and accumulated at the wireless device 102 during the time since the mobile device 104 most recently communicated with the wireless device 102 to receive data collected by the wireless device 102. Moreover, in case the plurality of data items and/or datasets included in the log record are time stamped, the mobile device 104 may communicate with the wireless device 102 to determine, based on their time stamps, which of the data items and/or datasets should be transferred to the mobile device 104.

As shown at 124 of the process 110 and complementary at 144 of the process 130, after receiving the updated data, the mobile device 104 may terminate the connection with the wireless device 102.

Optionally, after the connection between the mobile device 104 and the wireless device 102 is terminated, one or more other mobile devices 104, specifically mobile device(s) 104 which are in the transmission range of the wireless device 102, may establish a connection with the wireless device 102 via the wireless channel 106 to receive the updated data available at the wireless device 102. Each of the other mobile device(s) 104 may execute a process such as the process 130 to intercept the device identifier of the wireless device 102 and establish the connection with the wireless device 102 in response to detecting that the intercepted device identifier is adjusted (changed) compared to the device identifier of the wireless device 102 previously intercepted by the respective other mobile device 104.

Optionally, in case the device identifier, specifically the adjustable part of the intercepted device identifier associated with the updated data comprises a signature of the content of the updated data or part thereof, after receiving the updated data, the mobile device 104 may verify integrity of the content of the received updated data according to the signature extracted from the device. For example, assuming the signature comprises the checksum of the updated data's content, the mobile device 104 may compute the checksum of the content of the received updated data. The mobile device 104 may then compare between the computed checksum value and the checksum value extracted from the device identifier to verify the content. In another example, assuming the signature comprises the hash value computed based on the content of the updated data, the mobile device 104 may apply the (same) hash function(s) used by the wireless device 102 to compute the hash value based on the content of the received updated data. The mobile device 104 may then compare between the computed hash value and the hash value extracted from the device identifier to verify the content.

The mobile device 104 may analyze the updated data received from the wireless device and may generate one or more events based on the content of the updated data and/or based on analysis of the updated data. The mobile device 104 may be further configured to initiate one or more actions, for example, generate an indication, an alert, a notification and/or the like to notify the user(s) 108 of one or more of the events.

In particular, in case the wireless device 102 and the mobile device 104 are used to support one or more of the child safety applications and configured to collect sensory data from one or more pressure sensors 206 deployed in the child hosting apparatus, the mobile device 104 may generate one or more child safety related events based on the content of the updated data collected and received from the wireless device 102. For example, assuming that based on analysis of the updated data, the mobile device 104 determines that a child is present (sitting) in a nearby child hosting apparatus, for example, a car child seat, the mobile device 104 may generate an event accordingly and may further generate an indication to the associated user 106 to indicate of the presence of the child in the nearby child seat.

The mobile device 104 may further generate one or more events based on the content of the updated data and/or its analysis combined with a distance from the wireless device 102 inferred from the ability or inability to detect the wireless device 102 via the wireless channel 106. For example, assuming the wireless device 102 and the mobile device 104 are used to support one or more of the child safety applications, the mobile device 104 may generate one or more child safety related events based on the content of the updated data received from the wireless device 102 combined with the distance of the mobile device 104 from the wireless device 102. For example, assuming that based on analysis of the data most recently received from the wireless device 102, the mobile device 104 determines that a child is sitting in a nearby child hosting apparatus, for example, a car child seat. Further assuming that the mobile device 104 is no longer able to intercept the device identifier of the wireless device 102 which may be indicative that the wireless device 104 has moved out of the transmission range of the wireless device 102 and is hence located further than the certain distance, for example, 10 meters from the wireless device 102. In such case the mobile device 104 may generate an event accordingly and may further generate an alert to the associated user 106 to indicate that the user 106 may be moving away and potentially leaving the child in the child seat.

After terminating the connection with the wireless device 102, the mobile device 104 may branch back to 132 and continue probing the wireless channel 106 for one or more purposes, for example, detect a change in the device identifier of the wireless device 102, detect leaving the transmission range of the wireless device 102, detect one or more other wireless devices 102 and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms child hosting apparatus, child safety application, wireless channel, wireless device and mobile device are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of connecting temporarily to wireless devices indicating availability of updated data, comprising:
using at least one processor of a mobile device for:
receiving a device identifier of at least one wireless device broadcasted by the at least one wireless device via at least one wireless channel and intercepted by the mobile device, the device identifier comprising a fixed part uniquely identifying the at least one wireless device and an adjustable part indicative of associated data available at the at least one wireless device;
comparing between the adjustable part of the intercepted device identifier and the adjustable part of a previously intercepted device identifier of the at least one wireless device identified by the fixed part;
establishing a connection with the at least one wireless device via the at least one wireless channel in case the adjustable part of the intercepted device identifier is different from the adjustable part of the previously intercepted device identifier;
communicating with the at least one wireless device to receive updated data associated with the adjustable part of the intercepted device identifier; and
terminating the connection with the at least one wireless device.

2. The method according to claim 1, wherein the at least one wireless device is deployed for collecting information relating to at least one child located in at least one child hosting apparatus to support at least one child safety application.

3. The method according to claim 1, wherein the data comprises sensory data captured by at least one sensor communicatively coupled to the at least one wireless device.

4. The method according to claim 1, wherein the adjustable part is further indicative of at least part of a content of the data available at the at least one wireless device.

5. The method according to claim 1, wherein the adjustable part further comprises a signature of the available data.

6. The method according to claim 5, wherein the mobile device is further configured to verify integrity of at least part of the updated data according to the signature.

7. The method according to claim 1, wherein the updated data further comprises a log record comprising a plurality of data items accumulated by the at least one wireless device.

8. The method according to claim 1, further comprising generating at least one event based on content of the updated data and initiating at least one indication to alert a user of the mobile device of the at least one event.

9. The method according to claim 8, wherein the at least one event comprises a child safety related event.

10. The method according to claim 1, wherein the mobile device is configured to probe the at least one wireless channel every predefined time period.

11. The method according to claim 10, further comprising generating at least one event in response to detecting that the mobile device is in a transmission range of the at least one wireless device.

12. The method according to claim 10, further comprising generating at least one event in response to detecting that the mobile device is out of a transmission range of the at least one wireless device.

13. The method according to claim 10, wherein probing the at least one wireless channel is instructed by at least one constantly active service executed by the mobile device.

14. The method according to claim 10, wherein probing the at least one wireless channel is instructed by at least one inactive service invoked by an Operating System (OS) executed by the mobile device in response to detecting a beacon signal transmitted by the at least one wireless device.

15. The method according to claim 1, further comprising at least one other mobile device establishes a connection with the at least one wireless device to receive the updated data after the connection termination, the at least one other mobile device establishes the connection with the at least one wireless device in response to detecting that the adjustable part of the device identifier of the at least one wireless device is adjusted compared to the adjustable part of the device identifier of the at least one wireless device previously intercepted by the at least one other mobile device.

16. The method according to claim 1, wherein the at least one wireless channel is a member of a group consisting of: Bluetooth, Bluetooth Low energy (BLE), ZigBee, Z-WAVE, and Wireless Local Area Network (WLAN).

17. The method according to claim 1, wherein the fixed part and the adjustable part of the device identifier is defined by at one communication protocol applicable for the at least one wireless channel, the fixed part comprises at least one member of a group consisting of: Media Access Controller (MAC) address, and Internet Protocol (IP) address.

18. A mobile device for connecting temporarily to wireless devices indicating availability of updated data, comprising:
at least one wireless transceiver; and
at least one processor coupled to the at least one wireless transceiver, the at least one processor is adapted to execute code, the code comprising:
code instructions to receive a device identifier of at least one wireless device broadcasted by the at least one wireless device via at least one wireless channel and intercepted by at least one wireless transceiver of the mobile device, the identifier comprising a fixed part uniquely identifying the at least one wireless device and an adjustable part indicative of data available at the at least one wireless device;
code instructions to compare between the adjustable part of the intercepted device identifier and the adjustable part of a previously intercepted device identifier of the at least one wireless device identified by the fixed part;
code instructions to establish a connection with the at least one wireless device via the at least one wireless channel in case the adjustable part of the intercepted device identifier is different from the adjustable part of the previously intercepted device identifier;
code instructions to communicate with the at least one wireless device to receive updated data associated with the adjustable part of the intercepted device identifier; and
code instructions to terminate the connection with the at least one wireless device.

19. A method of indicating availability of updated data by a wireless channel, comprising:
using at least one processor of a wireless device for:
collecting updated data;
adjusting a device identifier of the wireless device, the device identifier comprising a fixed part uniquely identifying the wireless device and an adjustable part indicative of the updated data;
broadcasting the adjusted fixed device identifier via at least one wireless channel;
wherein, in response to interception of the adjusted device identifier, at least one mobile device establishes a connection with the wireless device via the at least one wireless channel to receive the updated data and terminates the connection after receiving the updated data.

20. A wireless device, comprising:
at least one wireless transceiver configured to connect to at least one wireless channel; and
at least one processor coupled to the at least one wireless transceiver, the at least one processor is adapted to execute code, the code comprising:
code instructions to collect updated data;
code instructions to adjust a device identifier of the wireless device, the device identifier comprising a fixed part uniquely identifying the wireless device and an adjustable part indicative of the updated data; and
code instructions to broadcast the adjusted device identifier via at least one wireless channel;
wherein, in response to interception of the adjusted device identifier, at least one mobile device establishes a connection with the wireless device via the at least one wireless channel to receive the updated data and terminates the connection after receiving the updated data.

* * * * *